| United States Patent [19] | [11] Patent Number: 4,885,330 |
|---|---|
| Brungardt et al. | [45] Date of Patent: Dec. 5, 1989 |

[54] NON-DISPERSIBLE VERMICULITE PRODUCTS

[75] Inventors: Clement L. Brungardt, Wilmington, Del.; Pamela K. Rush, West Grove, Pa.

[73] Assignee: Hercules Incorporated, Wilmington, Del.

[21] Appl. No.: 123,468

[22] Filed: Nov. 20, 1987

[51] Int. Cl.$^4$ .............................................. C08K 3/34
[52] U.S. Cl. .................................. 524/447; 524/450
[58] Field of Search ............................. 524/450, 447

[56] References Cited

U.S. PATENT DOCUMENTS

| H254 | 4/1987 | Hindman | 252/378 R |
|---|---|---|---|
| 1,972,390 | 9/1934 | Miner | 252/378 R |
| 2,625,512 | 4/1948 | Powell | 252/378 P |
| 2,626,872 | 1/1953 | Miscall | 252/378 R |
| 3,356,611 | 12/1967 | Walker et al. | 252/28 |
| 3,916,057 | 10/1975 | Hatch et al. | 524/450 X |
| 4,191,667 | 3/1980 | Wehrmann et al. | 524/450 X |
| 4,305,992 | 12/1981 | Langer et al. | 428/324 |
| 4,313,997 | 2/1982 | Ruff et al. | 428/220 |
| 4,391,733 | 7/1983 | Lamar et al. | 252/378 R |
| 4,391,734 | 7/1983 | Ferreira et al. | 252/378 R |
| 4,425,465 | 1/1984 | Padget et al. | 524/450 |
| 4,431,755 | 2/1984 | Weber et al. | 524/450 X |
| 4,485,203 | 11/1984 | Hutchinson | 524/450 X |
| 4,486,235 | 12/1984 | Kamigaito et al. | 106/287.12 |
| 4,520,073 | 5/1985 | Randolph et al. | 428/405 |

*Primary Examiner*—Joseph L. Schofer
*Assistant Examiner*—J. M. Reddick
*Attorney, Agent, or Firm*—John P. Luther; Marion C. Staves

[57] ABSTRACT

Provided is a process for the production of shaped vermiculite articles having excellent resistance to water dispersibility from an aqueous dispersion of vermiculite lamellae having incorporated therein a cationic polyquaternary ammonium salt.

5 Claims, No Drawings

NON-DISPERSIBLE VERMICULITE PRODUCTS

FIELD OF THE INVENTION

This invention concerns products comprising vermiculite having improved resistance to water dispersibility.

BACKGROUND OF THE INVENTION

It is known that vermiculite ore, a type of layer mineral (and other layer-silicate minerals containing vermiculite layers, e.g., hydrobiotite or chlorite vermiculite), can be delaminated and then sheared to form an aqueous dispersion of tiny particles or platelets of vermiculite known as vermiculite lamellae. It is also known that such dispersions of vermiculite lamellae can be used to fabricate shaped articles or products such as paper, sheets, films, rigid foams or composites with other fibrous materials. Such processes for delamination of vermiculite ore and product fabrication therefrom are set forth, for example, in U.S. Pat. Nos. 4,608,303; 4,472,478; 4,271,228; 3,791,969; 3,434,917; 3,325,340 and G.B. Pat. Nos. 2,007,153; 1,585,104; 1,119,305 and 1,076,786;

Articles composed wholly of vermiculite ore particles or composites comprising vermiculite ore particles possess a degree of structural integrity and such useful properties as high heat resistance making them particularly suited for use, for example, as thermal insulation materials, fireproof covering and packaging material and refractory-facing materials.

Notwithstanding such advantageous and useful properties, however, commercial uses of vermiculite articles have been limited by their poor resistance to water dispersibility as such articles tend to disintegrate after prolonged immersion. Various methods have been proposed to impart resistance to water dispersibility in vermiculite products wherein structural integrity of the vermiculite lamellae framework is maintained in aqueous media over long periods of time. Such methods typically propose the addition of "wet-strength" improvers to dispersions of vermiculite lamellae or the incorporation of such wet-strength improvers into articles formed therefrom. These methods include, for example, post-fabrication treatment of vermiculite articles with aqueous solutions of electrolytes, B.P. No. 1,016,385 and B.P. No. 1,593,382, and U.S. Pat. No. 4,608,303; and the post-fabrication treatment of such articles with ammonia vapor or the vapor of an organo amine compound, U.S. Pat. No. 4,219,609. Other methods include treatment of dispersions of vermiculite lamellae used to form products with solutions of inorganic ions, U.S. Pat. Nos. 4,269,628 and 4,497,869; the incorporation of a source of ammonia or ammonia ions, preferably urea, into a dispersion of vermiculite lamellae, U.S. Pat. No. 4,539,046; and the incorporation of a urea-formaldehyde or melamine-formaldehyde resin into a dispersion of vermiculite lamellae, U.S. Pat. No. 4,485,203.

Such methods, however, have been found to be less then satisfactory as they either involve tedious and expensive post treatment and/or curing of formed articles or require the incorporation of large quantities of organic materials which often degrade the desirable high temperature properties of articles comprising vermiculite. Processes which rely on treatment with inorganic ions or electrolytes are further undesirable in that wet strength properties provided by such processes can be severely diminished in the presence of exchangeable or competing ions.

SUMMARY OF THE INVENTION

The present invention avoids those undesirable aspects associated with the above-mentioned processes by providing a novel and improved process for the production of shaped vermiculite articles having excellent resistance to water dispersibility. In accordance with this invention, such processes comprises the steps of (1) incorporating into a dispersion of vermiculite lamellae cationic polyquaternary ammonium salt, then (2) forming shaped articles from the dispersion produced in step (1) by removing water from it.

The present invention is further illustrated by the following detailed description.

DETAILED DESCRIPTION OF THE INVENTION

The term "vermiculite" used herein refers to all materials known mineralogically or commercially as vermiculite, and minerals consisting wholly or largely of vermiculite including minerals of a mixed-layer type (phyllosilicates) containing vermiculite layers as a constituent such as hydrobiotites and chlorite-vermiculites, and which can be delaminated in the same or similar manner as vermiculite. While vermiculite is the preferred layer mineral, other layer minerals may be used including montmorillonite, kaolinite and clays comprising sepiolite, kaolinite, and other layer silicate minerals which can be delaminated to produce lamellae or plate-like particles.

Vermiculite lamellae or platelets can be characterized as having a particle size typically less than about 200 microns, preferably less than about 50 microns, and having one dimension that is small compared to the other two dimensions with a preferable aspect ratio (i.e., the ratio of the maximum dimension of length or breadth to thickness) of at least about 10, more preferably from about 40-60.

Dispersions of vermiculite lamellae useful in this invention may be formed by any suitable method known in the art. For example, vermiculite ore can be heated to temperatures in excess of 1000° F. to exfoliate or expand vermiculite ore particles followed by dispersing the particles in water and then mechanically shearing said particles to the desired size. Such a process is described, for example, in U.S. Pat. Nos. 4,486,235 and 4,271,228.

Alternatively, vermiculite ore can be contacted with a solution of hydrogen peroxide which swells the vermiculite ore particles therein followed by mechanically shearing the swollen particles to platelets or lamellae of a desired size. Such a process is also described, for example, in U.S. Pat. No. 4,486,235.

A preferred process for producing dispersions of vermiculite lamellae useful in accordance with this invention is described, for example, in U.S. Pat. Nos. 4,608,303 and 3,325,340, and G.B. Pat. No. 1,593,382. In such a process, aqueous suspensions of swollen vermiculite ore particles can be prepared by substituting monovalent inorganic cations and/or organo cations for exchangeable cations retained by the ore followed by a subsequent step of aqueous washing to effect macroscopic ore particle swelling. The swollen ore particles are then mechanically sheared to delaminate the vermiculite particulite structure therein producing an aqueous dispersion of vermiculite lamellae. Specific examples of preferred organo cations known from prior art to effect vermiculite ore particle swelling and therefore useful in the practice of this invention include diallyldimethylammonium, diallylammonium, allyldimethylsulfonium, n-butylammonium, iso-butylammonium, propylammonium, iso-amylammonium, crotyltriethylammonium, methacryloxyethyltrimethylammonium, 3-acryloxyneopentyltrimethylammonium, 2-methacryloxyethyltertiarybutylammonium, methacrylamidopropyltrimethylammonium, acrylamidopropyltrimethylammonium, butenyltrimethylammonium, vinylpyridinium ions such as N-methyl-2-vinylpyridinium, vinylbenzyldimethylsulfonium, vinylbenzyltrimethylammonium, 2,3-epoxypropyltrimethylammonium, triethylvinylphosphonium, tributylvinylphosphonium, α-ammonium-α-butyrolactone, glycidyltrimethylammonium, 1-methyl-1-tertiarybutylaziridinium, and 1-ethyl-1,2,-3-trimethylazetidinum. Of the various organo cations capable of swelling vermiculite ore particles, the most effective in practicing the present invention are alkylammonium compounds having at least 3 carbon atoms included in at least one alkyl group, especially diallyldimethylammonium, and useful in amounts ranging from about 50% to about 200% by weight based on the amount of vermiculite present in the aqueous suspension.

In accordance with this invention, shaped vermiculite articles having excellent resistance to water dispersibility are produced from dispersions of vermiculite lamellae in which a cationic polyquaternary ammonium salts has been incorporated. The cationic polyquaternary ammonium salts can be absorbed or adsorbed by the tiny particles of vermiculite lamellae therein coating the particles either upon their entire surface or on one or more spots of the respective particles. It is believed that such compounds can be retained on the vermiculite particle mineral surface by electrostatic forces to form coatings on the particles which are stable and adherent to the particles, and which remain on the particles in the aqueous dispersion of vermiculite lamellae and during the formation of shaped articles therefrom. Thus, the finished shaped articles are believed to comprise particles of vermiculite lamellae which carry absorbed or adsorbed cationic polyquaternary ammonium salts in accordance with this invention.

In general, any conventional cationic polyquaternary ammonium salt disclosed in the prior art is useful in this invention. Examples of such compounds which are preferred include polyquaternary ammonium salts such as poly(N-methyldiallylamine) quaternized with epichlorohydrin commercially available as Kymene® 2064 from Hercules Incorporated. Other examples of polyquaternary ammonium salts include poly(vinylbenzyltrimethylammonium chloride) available under the Dow QX line of compounds from Dow Chemical Company; azetidinium ion substituted polyamide from the condensation of diethylene triamine with adipic acid followed by reaction of the amine nitrogen with epichlorohydrin available as Kymene 557 H and azetidinium functionalized polymer of bis(hexamethylenetriamine) crosslinked with epichlorohydrin available as Kymene 367, respectively, from Hercules Incorporated; methylbis-(3-aminopropylamine)-copolyurea-polyoxamide-epichlorohydrin and methylbis-(3-aminopropylamine)co-polyamide-polyoxamide-epichlorohydrin, both available as PMC D-45 and PMC D-46, respectively, from Hercules Incorporated.

The cationic polyquaternary ammonium salt can be incorporated into the dispersion of vermiculite lamellae at any stage during the production or use thereof. Typically, the compound is most conveniently added to the post-formed dispersion of vermiculite lamellae prior to the fabrication of shaped articles therefrom. However, if desirable, the compound can alternatively be incorporated into a suspension of expanded, exfoliated or swollen ore particles prior to shearing and delamination of the particles to produce lamellae of a desired size.

The amount of cationic polyquaternary ammonium salt incorporated into the dispersion of vermiculite lamallae will range generally from about 0.01% to about 50% by weight, preferably from about 0.1% to about 4% by weight, based upon the dry weight of vermiculite in the dispersion. Total solids content of dispersions of vermiculite lamellae useful in this invention can range generally from about 0.1% to about 70% by weight dry vermiculite, preferably from about 2% to about 35% by weight. The amount of cationic compound employed can be influenced by such factors as the specific compound employed, the total solids content of dispersion and the level of water non-dispersibility desired in the shaped articles manufactured from the dispersions. Although the amount of cationic compound employed may range outside of those levels described, in general, amounts of about 2% or less have been found to be adequate to achieve the desired level of water non-dispersibility in finished articles, with amounts greater than about 2% producing no significant advantage in effecting water nondispersibility.

Depending on the charge density of the cationic compound employed, whether it be highly cationic or anionic or partially so, such compound can be added directly to disprsions of vermiculite lamellae in amounts and at such a rate that the dispersion is not immediately flocculated. If desired, a deflocculating agent may be employed in the dispersion before the incorporation of the compound. Of course, the compound may be added as a solution in a suitable solvent to the dispersion of vermiculite lamellae should this route prove to be more convenient to the manufacture. In any event, the method of addition of the compound to the dispersion of vermiculite lamellae or to the aqueous solution of non-sheared exfoliated or swollen vermiculite ore particles is not critical.

Dispersions of vermiculite lamellae having incorporated therein a cationic compound in accordance with this invention can be used to manufacture any article comprising vermiculite as disclosed by the prior art, for example, films, coatings, sheets and non-sheet solids composed of in part or substantially wholly vermiculite lamellae, by any method known in the art.

Other materials may be added to dispersions of vermiculite lamellae produced in accordance with this invention, depending on the particular properties and end uses contemplated of articles manufactured therefrom. For example, continuous (filamentary), discontinuous (chopped or staple), or agglomerates of carbon (graphite), glass, boron, silica or ceramic type fibers can be impregnated with or incorporated into dispersions of vermiculite lamellae in accordance with this invention to prepare fibrous vermiculite composite structures having excellent water non-dispersibility. The array of articles, their methods of manufacture, and their corresponding end uses will be readily apparent to those skilled in the art.

The following examples more fully illustrate preferred embodiments of the present invention. It is to be understood, however, that this invention is not intended to be limited in anyway thereto.

EXAMPLE 1

This example illustrates the preparation of water non-dispersible films from dispersions of vermiculite lamellae having incorporated therein, preferred cationic polyquaternary ammonium salts in accordance with the instant invention.

An aqueous dispersion of vermiculite lamellae is prepared by first digesting 15 weight percent Grade 4 vermiculite ore particles (ASTM Material Designation C-516) in a saturated sodium chloride solution at reflux for 2 hours, then cooling the resulting suspension to room temperature and filtering. Excess salts are then removed from the filtrate by washing with distilled water.

594 grams of the sodium exchanged vermiculite ore prepared above is digested with agitation in 1.1 liters of 2 molar diallyldimethylammonium chloride solution at reflux for 8 hours, then cooled to room temperature. After washing and agitating 4 times with 1.1 liters of distilled water, ultimately resulting in a 54 weight % solids suspension of exfoliated or swollen vermiculite ore particles, a shearing action is then applied which results in an aqueous dispersion of vermiculite lamellae.

Portions of the indicated cationic compounds are then added to the dispersion of vermiculite lamellae in the respective amounts indicated in Table I below. After a thorough mixing of each compound in the vermiculite lamellae dispersion, a film of each is cast and allowed to dry over a three day period, then cured at 80° C. for 1 hour. A 1"×1" sample of each film is then placed in room temperature and boiling water to check for water dispersibility and the respective results recorded in Table 1.

As demonstrated by the results in Table 1, a sample of vermiculite sheet material prepared from vermiculite lamellae containing no cationic compound in accordance with this invention is observed to distintegrate after exposure to room temperature water for less then one hour, and after exposure to boiling water for less than one-half hour.

TABLE 1

| Compound | *Weight % Addition | Water Non-Dispersibility Room Temperature (hours) | Boiling (hours) |
|---|---|---|---|
| Blank | 0 | <1 | <.5 |
| Kymene ® 2064 | 2 | >24 | >1 |
| Kymene 557H | 2 | >24 | >1 |
| Kymene 367 | 2 | >24 | >1 |
| PMC D-45 | 2 | >24 | >1 |
| Calgon 261 | 2 | >24 | >1 |

*based on percent vermiculite present.

We claim:
1. An aqueous dispersion of vermiculite lamellae having incorporated therein from about 0.1% to about 4% by weight, based upon the dry weight of vermiculite in the dispersion, of a cationic polyquaternary ammonium salt.
2. A process for the production of an aqueous dispersion of vermiculite lamellae comprising incorporating into a dispersion of vermiculite lamellae from about 0.1% to about 4% by weight, based upon the dry weight of vermiculite in the dispersion, of a cationic polyquaternary ammonium salt.
3. A shaped article produced from an aqueous dispersion of vermiculite lamellae having incorporated therein from about 0.1% to about 4% by weight, based upon the dry weight of vermiculite in the dispersion, of a cationic polyquaternary ammonium salt.
4. An aqueous dispersion of layer silicate mineral lamellae having incorporated therein from about 0.1% to about 4% weight, based upon the dry weight of layer silicate mineral in the dispersion, of a cationic polyquaternary ammonium salt.
5. An aqueous dispersion as claimed in claim 4 wherein the layer silicate mineral is selected from kaolinite, montmorillonite or sepiolite.

* * * * *